United States Patent [19]

Brod et al.

[11] Patent Number: 5,554,200
[45] Date of Patent: Sep. 10, 1996

[54] OIL ADDITIVES AND COMPOSITIONS

[75] Inventors: Ramah J. Brod, Abingdon; Brian W. Davies, Blewbury; Tuncel Ibrahim, Abingdon, all of United Kingdom

[73] Assignee: Exxon Chemical Patents Inc, Linden, N.J.

[21] Appl. No.: 360,666

[22] PCT Filed: Jun. 29, 1993

[86] PCT No.: PCT/EP93/01666

§ 371 Date: Dec. 21, 1994

§ 102(e) Date: Dec. 21, 1994

[87] PCT Pub. No.: WO94/00386

PCT Pub. Date: Jan. 6, 1994

[30] Foreign Application Priority Data

Jun. 30, 1992 [GB] United Kingdom .......... 9213904

[51] Int. Cl.$^6$ .......... C10L 1/18; C10M 145/08
[52] U.S. Cl. .......... 44/393; 44/395; 508/467; 508/472
[58] Field of Search .......... 44/393, 395; 252/56 R

[56] References Cited

U.S. PATENT DOCUMENTS

| 4,661,121 | 4/1987 | Lewtas | 44/393 |
| 4,802,892 | 2/1989 | Shimada et al. | 44/393 |
| 5,205,839 | 4/1993 | Reimann | 44/393 |
| 5,256,166 | 10/1993 | Fischer | 44/393 |
| 5,330,545 | 7/1994 | Lewtas et al. | 44/393 |

*Primary Examiner*—Jacqueline V. Howard
*Attorney, Agent, or Firm*—John J. Mahon

[57] ABSTRACT

Compositions comprising two or more ethylene-unsaturated ester copolymers differing in their ester proportions improve the low temperature properties of fuel oils.

26 Claims, No Drawings

OIL ADDITIVES AND COMPOSITIONS

This invention relates to oil compositions, primarily to fuel oil compositions, and more especially to fuel oil compositions susceptible to wax formation at low temperatures, and to additive compositions for such fuel oil compositions.

Heating oils and other distillate petroleum fuels, for example, diesel fuels, contain alkanes that at low temperature tend to precipitate as large crystals of wax in such a way as to form a gel stricture which causes the fuel to lose its ability to flow. The lowest temperature at which the fuel will still flow is known as the pour point.

As the temperature of the fuel falls and approaches the pour point, difficulties arise in transporting the fuel through lines and pumps. Further, the wax crystals tend to plug fuel lines, screens, and filters at temperatures above the pour point. These problems are well recognized in the art, and various additives have been proposed, many of which are in commercial use, for depressing the pour point of fuel oils. Similarly, other additives have been proposed, and are in commercial use for reducing the size and changing the shape of the wax crystals that do form. Smaller size crystals are desirable since they are less likely to clog a filter; certain additives inhibit the wax from crystallizing as platelets and cause it to adopt an acicular habit, the resulting needles being more likely to pass through a filter than are platelets. The additives may also have the effect of retaining in suspension in the fuel the crystals that have formed, the resulting reduced settling also assisting in prevention of blockages.

Effective wax crystal modification (as measured by CFPP and other operability tests, as well as simulated and field performance) may be achieved by ethylene-vinyl acetate or propionate copolymer (EVAC or EVPC)-based flow improvers.

In EP-A-45342 is described a cold flow additive, based on an EVAC modified by esterification with 2-ethylhexanoic, acrylic, and phthalic acids.

In "Wissenschaft und Technik" 42(6), 238 (1989), M. Ratsch & M. Gebauer describe cold flow additives including an EVAC esterified with, inter alia, n-hexanoic acid.

In U.S. Pat. No. 3,961,916, middle distillate flow improvers are described which comprise a wax growth arrestor and a nucleating agent, the former being preferably a lower molecular weight ethylene-vinyl ester copolymer with a higher ester content, the latter preferably a higher molecular weight copolymer with a lower ester content, the esters preferably, but not necessarily, both being vinyl acetate.

In DE-AS-2407158, middle distillate flow improvers are described, comprising a mixture of low molecular weight ethylene-vinyl ester and ethylene-acrylic acid ester copolymers, both containing at least 40 mole per cent of the ester component.

The present invention is concerned to provide an oil, especially a fuel oil, additive effective to improve low temperature flow of the oil, and is based on the observation that a composition comprising at least two different copolymers of ethylene with an unsaturated ester, or a composition comprising a copolymer of ethylene with at least two different types of unsaturated ester-derivable units, is an effective cold flow improver having advantages over previously proposed compositions.

In a first aspect, the present invention provides a composition comprising:

(i) an oil-soluble ethylene copolymer having, in addition to units derived from ethylene, from 7.5 to 35 molar per cent of units of the formula $$-CH_2-CRR^1-  \qquad \text{I}$$

and (ii) an oil-soluble ethylene copolymer having, in addition to units derived from ethylenes up to 10 molar per cent of units of the formula $$-CH_2-CRR^2-  \qquad \text{II}$$

wherein each R independently represents H or $CH_3$, and each $R^1$, and $R^2$ independently represents a group of the formula $COOR^3$ or $OOCR^4$, wherein $R^3$ and $R^4$ independently represent a hydrocarbyl group, provided that $R^1$ and $R^2$ do not both represent the acetate group, the proportion of units I in polymer (i) being at least 2 molar percent greater than the proportion of units II in polymer (ii).

As used in this specification the term "hydrocarbyl" refers to a group having a carbon atom directly attached to the rest of the molecule and having a hydrocarbon or predominantly hydrocarbon character. Among these, there may be mentioned hydrocarbon groups, including aliphatic, (e.g., alkyl or alkenyl), alicyclic (e.g., cycloalkyl or cycloalkenyl), aromatic, aliphatic and alicyclic-substituted aromatic, and aromatic-substituted aliphatic and alicyclic groups. Aliphatic groups are advantageously saturated. These groups may contain non-hydrocarbon substituents provided their presence does not alter the predominantly hydrocarbon character of the group. Examples include keto, halo, hydroxy, nitro, cyano, alkoxy and acyl. If the hydrocarbyl group is substituted, a single (mono) substituent is preferred. Examples of substituted hydrocarbyl groups include 2-hydroxyethyl, 3-hydroxypropyl, 4-hydroxybutyl, 2-ketopropyl, ethoxyethyl, and propoxypropyl. The groups may also or alternatively contain atoms other than carbon in a chain or ring otherwise composed of carbon atoms. Suitable hetero atoms include, for example, nitrogen, sulfur, and, preferably, oxygen. Advantageously, the hydrocarbyl group contains at most 30, preferably at most 15, more preferably at most 10 and most preferably at most 8, carbon atoms.

Advantageously, R represents H.

Advantageously, $R^3$ and $R^4$ each independently represents an alkenyl or as indicated above, preferably, an alkyl group, which is advantageously linear. If the alkyl or alkenyl group is branched, for example, as in the 2-ethylhexyl group, the α-carbon atom is advantageously part of a methylene group. Advantageously, the alkyl or alkenyl group contains up to 30 carbon atoms, preferably from 1 (2 in the case of alkenyl) to 14 carbon atoms, and more preferably from 4 to 10 carbon atoms. As examples of alkyl or alkenyl groups there may be mentioned propyl, n-butyl, isobutyl, and isomers, preferably the linear isomers, of pentyl, hexyl, heptyl, octyl, nonyl, decyl, undecyl, dodecyl, tridecyl, tetradecyl, pentadecyl, hexadecyl, heptadecyl, octadecyl, nonadecyl and icosyl, and their corresponding alkenyl, advantageously alk-omega-enyl, radicals. When $R^1$ and/or $R^2$ are of the formula $OOCR^4$, $R^4$ most preferably represents pentyl, and as indicated above, is advantageously n-pentyl.

As cycloalkyl, alkaryl and aryl radicals, there may be mentioned, for example, cyclohexyl, benzyl and phenyl.

The copolymer or copolymers may also contain units of formulae other than those mentioned above, for example units of the formula $$-CH_2-CRR^5-  \qquad \text{III}$$

where $R^5$ represents —OH, or of the formula $$—CCH_3(CH_2R^6)—CHR^7— \quad\quad IV$$

where $R^6$ and $R^7$ each independently represent hydrogen or an alkyl group with up to 4 carbon atoms, the units IV advantageously being derived from isobutylene, 2-methyl-but-2-ene or 2-methylpent-2-ene.

Units of the formula I or II may be terminal units but are advantageously internal units. Advantageously, units of the formula I represent from 10 to 25, preferably from 10 to 20, and more preferably from 11 to 16, mole per cent of the polymer (i). Advantageously, units of the formula II represent up to 7.5, preferably from 0.3 to 7.5, and more preferably from 3.5 to 7.0, mole per cent of the polymer (ii).

The copolymer (i) advantageously has a number average molecular weight, as measured by gel permeation chromatography, of at most 14,000, advantageously at most 10,000, more advantageously in the range of 1,400 to 7,000, preferably 2,000 to 5,500 and most preferably about 4,000. For the polymer (ii) the number average molecular weight is advantageously at most 20,000, preferably up to 15,000 and more preferably from 1,200 to 10,000, and most preferably from 3,000 to 10,000. The preferred number average molecular weight will depend to some extent on the number of carbon atoms in $R^3$ and $R^4$, the higher that number the higher the preferred molecular weight within the range above. Advantageously, the number average molecular weight of the polymer (ii) is greater, by at least 500, and preferably at least 1,000, than that of polymer (i).

Polymers in which $R^1$ or $R^2$ represents $OOCR^4$ are preferred and more preferably both $R^1$ and $R^2$ both represent $OOCR^4$.

It is within the scope of the invention to use two or more polymers (i) and/or two or more polymers (ii) in the same additive composition. It is also within the scope of the invention to employ a polymer (i) or (ii) having two or more different units of types I and II. Units I in polymer (i) may be the same as or different from units II in polymer (ii), provided, as indicated above, they do not both contain the acetate group.

The invention also provides an oil containing the additive composition, and an additive concentrate comprising the additive composition in admixture with an oil or a solvent miscible with the oil. The invention further provides the use of the additive composition to improve the low temperature properties of an oil. The oil may be a crude oil, i.e. oil obtained directly from drilling and before refining, the compositions of this invention being suitable for use as flow improvers therein.

The oil may be a lubricating oil, which may be an animal, vegetable or mineral oil, such, for example, as petroleum oil fractions ranging from naphthas or spindle oil to SAE 30, 40 or 50 lubricating oil grades, castor oil, fish oils or oxidized mineral oil. Such an oil may contain additives depending on its intended use; examples are viscosity index improvers such as ethylene-propylene copolymers, succinic acid based dispersants, metal containing dispersant additives and zinc dialkyl-dithiophosphate antiwear additives. The compositions of this invention may be suitable for use in lubricating oils as flow improvers, pour point depressants or dewaxing aids.

The oil may be a fuel oil, especially a middle distillate fuel oil. Such distillate fuel oils generally boil within the range of from 110° C. to 500° C., e.g. 150° to 400° C. The fuel oil may comprise atmospheric distillate or vacuum distillate, or cracked gas oil or a blend in any proportion of straight run and thermally and/or catalytically cracked distillates. The most common petroleum distillate fuels are kerosene, jet fuels, diesel fuels, heating oils and heavy fuel oils. The heating oil may be a straight atmospheric distillate, or it may contain minor amounts, e.g. up to 35 wt %, of vacuum gas oil or cracked gas oils or of both. The above-mentioned low temperature flow problem is most usually encountered with diesel fuels and with heating oils. The invention is also applicable to vegetable-based fuel oils, for example rape seed oil.

The additive or additives should preferably be soluble in the oil to the extent of at least 1000 ppm by weight per weight of oil at ambient temperature. However, at least some of the additive may come out of solution near the cloud point of the oil and function to modify the wax crystals that form.

In the composition according to the invention, the linearity of the polymers as expressed by the number of methyl groups per 100 methylene units, as measured by proton NMR, is advantageously from 1 to 15.

The copolymers may be made by any of the methods known in the art, e.g., by solution polymerization with free radical initiation, or by high pressure polymerization, conveniently carried out in an autoclave or a tubular reactor.

Alternatively, the copolymer may be made by saponification and re-esterification of an ethylene-vinyl acetate or propionate, or an ethylene-methyl or ethyl (meth)acrylate, copolymer.

A further method of making the copolymer is by transesterification, provided that the entering acid or alcohol is less volatile than that being removed.

If desired all, or substantially all, existing ester groups may be hydrolysed and completely replaced by the desired chain substituents. Alternatively, a proportion only may be hydrolysed, so that the resulting polymer contains, for example, acetate side chains and chains of longer length.

Polymers containing units I and units II are advantageously present in a weight ratio of from 10:1 to 1:10, preferably from 10:1 to 1:3, and more preferably from 7:1 to 1:1.

The additive composition and the oil composition may contain other additives for improving low temperature and/or other properties, many of which are in use in the art or known from the literature.

For example, the composition may also contain a further ethylene-vinyl ester, especially acetate copolymer, especially one having a number average molecular weight in the range of at most 14,000, and a vinyl ester content of 7.5 to 35 molar per cent.

The additive composition may also comprise a comb polymer. Such polymers are discussed in "Comb-Like Polymers. Structure and Properties", N. A. Plate and V. P. Shibaev, J. Poly. Sci. Macromolecular Revs., 8, p 117 to 253 (1974).

Advantageously, the comb polymer is a homopolymer having, or a copolymer at least 25 and preferably at least 40, more preferably at least 50, molar per cent of the units of which have, side chains containing at least 6, and preferably at least 10, atoms.

As examples of preferred comb polymers there may be mentioned those of the general formula

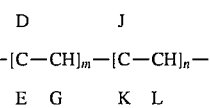

wherein D=$R^{11}$, $COOR^{11}$, $OCOR^{11}$, $R^{12}COOR^{11}$, or $OR^{11}$,
E=H, $CH_3$, D, or $R^{12}$, G=H or D J=H, $R^{12}$, $R^{12}COOR^{11}$, or an aryl or heterocyclic group, K=H, $COOR^{12}$, $OCOR^{12}$, $OR^{12}$, or COOH, L=H, $R^{12}$, $COOR^{12}$, $OCOR^{12}$, COOH, or aryl, $R^{11}$ $C_{10}$ hydrocarbyl, $R^{12}$ $C_1$ hydrocarbyl, and m and n represent mole ratios, m being within the range of from 1.0 to 0.4, n being in the range of from 0 to 0.6. $R^{11}$ advantageously represents a hydrocarbyl group with from 10 to 30 carbon atoms, while $R^{12}$ advantageously represents a hydrocarbyl group with from 1 to 30 carbon atoms.

The comb polymer may contain units derived from other monomers if desired or required. It is within the scope of the invention to include two or more different comb copolymers.

These comb polymers may be copolymers of maleic anhydride or fumaric acid and another ethylenically unsaturated monomer, e.g., an α-olefin or an unsaturated ester, for example, vinyl acetate° It is preferred but not essential that equimolar amounts of the comonomers be used although molar proportions in the range of 2 to 1 and 1 to 2 are suitable. Examples of olefins that may be copolymerized with e.g., maleic anhydride, include 1-decene, 1-dodecene, 1-tetradecene, 1-hexadecene, and 1-octadecene.

The copolymer may be esterified by any suitable technique and although preferred it is not essential that the maleic anhydride or fumaric acid be at least 50% esterified. Examples of alcohols which may be used include n-decan-1-ol, n-dodecan-1-ol, n-tetradecan-1-ol, n-hexadecan-1-ol, and n-octadecan-1-ol. The alcohols may also include up to one methyl branch per chain, for example, 1-methylpentadecan-1-ol, 2-methyltridecan-1-ol. The alcohol may be a mixture of normal and single methyl branched alcohols. It is preferred to use pure alcohols rather than the commercially available alcohol mixtures but if mixtures are used the $R^{12}$ refers to the average number of carbon atoms in the alkyl group; if alcohols that contain a branch at the 1 or 2 positions are used $R^{12}$ refers to the straight chain backbone segment of the alcohol.

These comb polymers may especially be fumarate or itaconate polymers and copolymers such for example as those described in European Patent Applications 153176, 153177 and 225688, and WO 91/16407.

Particularly preferred fumarate comb polymers are copolymers of alkyl fumarates and vinyl acetate, in which the alkyl groups have from 12 to 20 carbon atoms, more especially polymers in which the alkyl groups have 14 carbon atoms or in which the alkyl groups are a mixture of $C_{14}/C_{16}$ alkyl groups, made, for example, by solution copolymerizing an equimolar mixture of fumaric acid and vinyl acetate and reacting the resulting copolymer with the alcohol or mixture of alcohols, which are preferably straight chain alcohols. When the mixture is used it is advantageously a 1:1 by weight mixture of normal $C_{14}$ and $C_{16}$ alcohols. Furthermore, mixtures of the $C_{14}$ ester with the mixed $C_{14}/C_{16}$ ester may advantageously be used. In such mixtures, the ratio of $C_{14}$ to $C_{14}/C_{16}$ is advantageously in the range of from 1:1 to 4:1, preferably 2:1 to 7:2, and most preferably about 3:1, by weight.

Other suitable comb polymers are the polymers and copolymers of -olefins and esterified copolymers of styrene and maleic anhydride, and esterified copolymers of styrene and fumaric acid; mixtures of two or more comb polymers may be used in accordance with the invention and, as indicated above, such use may be advantageous.

The additive composition may also comprise polar nitrogen compounds, for example those described in U.S. Pat. No. 4,211,534, especially an amide-amine salt of phthalic anhydride with two molar proportions of hydrogenated tallow amine, or the corresponding amide-amine salt of ortho-sulphobenzoic anhydride.

The additive composition of the invention may also comprise a copolymer of ethylene and at least one α-olefin, having a number average molecular weight of at least 30,000. Preferably the α-olefin has at most 20 carbon atoms. Examples of such olefins are propylene, 1-butene, isobutene, n-octene-1, isooctene-1, n-decene -1, and n-dodecene-1. The copolymer may also comprise small amounts, e.g., up to 10% by weight of other copolymer- izable monomers, for example olefins other than α-olefins, and non-conjugated dienes. The preferred copolymer is an ethylene-propylene copolymer. It is within the scope of the invention to include two or more different ethylene-α-olefin copolymers of this type.

The number average molecular weight of the ethylene-α-olefin copolymer is, as indicated above, at least 30,000, as measured by gel permeation chromatography (GPC) relative to polystyrene standards, advantageously at least 60,000 and preferably at least 80,000. Functionally no upper limit arises but difficulties of mixing result from increased viscosity at molecular weights above about 150,000, and preferred molecular weight ranges are from 60,000 and 80,000 to 120,000.

Advantageously, the copolymer has a molar ethylene content between 50 and 85 per cent. More advantageously, the ethylene content is within the range of from 57 to 80%,and preferably it is in the range from 58 to 73%; more preferably from 62 to 71%, and most preferably 65 to 70%.

Preferred ethylene-α-olefin copolymers are ethylene-propylene copolymers with a molar ethylene content of from 62 to 71% and a number average molecular weight in the range 60,000 to 120,000, especially preferred copolymers are ethylene-propylene copolymers with an ethylene content of from 62 to 71% and a molecular weight from 80,000 to 100,000.

The copolymers may be prepared by any of the methods known in the art, for example using a Ziegler type catalyst. The polymers should be substantially amorphous, since highly crystalline polymers are relatively insoluble in fuel oil at low temperatures.

The additive composition may also comprise a further ethylene-α-olefin copolymer, advantageously with a number average molecular weight of at most 7500, advantageously from 1,000 to 6,000, and preferably from 2,000 to 5,000, as measured by vapour phase osmometry. Appropriate α-olefins are as given above, or styrene, with propylene being preferred. Advantageously the ethylene content is from 60 to 77 molar per cent although for ethylene-propylene copolymers up to 86 molar per cent by weight ethylene may be employed with advantage.

The composition may also comprise poly(ethylene glycol) esters, advantageously of fatty acids containing from 18 to 22 carbon atoms in the chain, especially when the fuel being treated lacks higher alkanes that act as wax crystallization nucleators.

In addition, the additive composition and the fuel oil composition may contain additives for other purposes, e.g., for reducing particulate emission or inhibiting colour and sediment formation during storage.

The fuel oil composition of the invention advantageously contains the additive of the invention, i.e., components (i) and (ii) above, in a total proportion of 0.0005% to 1%, advantageously 0.001 to 0.1%, and preferably 0.04 to 0.06% by weight, based on the weight of fuel.

The following Examples, in which all parts and percentages are by weight, and number average molecular weights are measured by gel permeation chromatography, illustrate the invention.

Example A

10 Kg (3.33 mole) of an ethylene-vinyl acetate copolymer containing 35% by weight vinyl acetate, Mn 3,000, degree of branching $4CH_3/100\ CH_2$, is charged into a flask equipped with a condenser and heated to 60° C. with stirring under a nitrogen blanket. 216 g (1 mole) of sodium methoxide in 1.5 l n-butanol is added cautiously to the polymer, and subsequently a further 4 l of n-butanol. The solution changes from clear to orange, and the temperature falls to 46° C. The mixture is then heated to 90° C., the colour turning to deep red, and maintained at that temperature with stirring for 2 hours.

The reaction mixture is then heated at 104° C., at a pressure of 370 mmHg, to distil off approximately 4 l butyl acetate. The remaining viscous polymer is poured at 90° C. into an acidified (150 ml 36 wt % solution of HCl) solvent comprising 100 l water and 5 l acetone. The solution is stirred for 3 hours, and the solids allowed to settle overnight at pH 6. After draining, the polymer is filtered through a fine mesh cloth and dried at 70° C.

20 g of the resulting polymer (Mn 3300, 85% hydrolysed as determined by NMR) are dissolved in an anhydrous mixture of 100 ml toluene and 10 ml pyridine. 30 ml lauroyl chloride dissolved in 100 ml toluene is added dropwise and the reaction mixture stirred for 1 hour at room temperature. The resulting solids are filtered off and solvent removed under vacuum to yield a viscous polymer. Further drying at 120° C. in vacuo to remove volatiles gives 21 g of a polymer in which $R^1$ represents a group of the formula $—OOCR^4$, $R^4$ representing n-undecyl. Yield 21 g, Mn 5000.

Example B

The second part of Example A was repeated, but esterifying 50 g of the saponified polymer with myristoyl chloride to give a polymer in which $R^1$ represents
$—OOCR^3$, $R^3$ representing n-tridecyl. Yield 40 g, Mn 5000.

Example C

The second part of Example A was repeated, but esterification was with hexanoyl chloride, yielding a polymer Mn 3700, in which in $—OOCR^4$ $R^4$ represents n-pentyl.

Example D

The procedure of the first part of Example A was repeated, saponifying 450 g of an ethylene-vinyl acetate copolymer, 13.5% by weight vinyl acetate, Mn 5,000, degree of branching $6\ CH_3/100\ CH_2$, using 47.5 g sodium methoxide and a total 250 g n-butanol.

50 g of the resulting polymer (Mn 4000, 93% hydrolysis) are dissolved in an anhydrous solvent mixture comprising 375 ml toluene and 8 ml pyridine. 14 ml hexanoyl chloride in 250 ml toluene are added dropwise and the resulting mixture stirred for 5 hours at room temperature. The solids are filtered and solvent removed in vacuo to yield a viscous polymer which is further dried in vacuo at 120° C. to yield 38 g of a polymer (Mn 4000) in which $R^2$ represents $—OOCR^4$, $R^4$ representing n-pentyl.

Example E

The procedure of the first part of Example A was repeated, saponifying 100 g of an ethylene-vinyl acetate copolymer containing 29% by weight vinyl acetate, Mn 3,300, degree of branching $CH_3/100\ CH_2$: 4, using 19.3 g sodium methoxide and 90 g n-butanol. Yield: 74 g; Mn 3000, 93% hydrolysis.

20 g of the resulting saponified polymer are dissolved in an anhydrous solvent comprising 150 ml toluene and 6 ml pyridine at room temperature. 10 ml hexanoyl chloride in 100 ml toluene are added dropwise and the reaction mixture stirred for 5 hours at room temperature. The product is dried as described in Example A, yielding 20 g of a similar polymer.

Example F

The procedure of Example A was repeated, but the saponified product was re-esterified with n-heptanoyl chloride.

Example G

The procedure of Example A was repeated, but the saponified product was re-esterified with n-octanoyl chloride.

Example H

Into a 3 liter stirred autoclave were charged 636 g of cyclohexane, 148.5 g of vinyl butyrate, and sufficient ethylene to achieve a pressure of 97 bar (9.7 MPa) at 124° C. 18 g of t-butyl peroctoate were dissolved in 85 ml cyclohexane and metered in with a further 351 g of vinyl butyrate and ethylene to maintain the above pressure over 75 minutes. After a soak time of 10 minutes, the reactor vessel was flushed with xylene.

After evaporation of solvent, 992 g of ethylene-vinyl butyrate copolymer were recovered, vinyl butyrate content 36%, Mn 2400.

Example J

A mixture containing vinyl acetate, isobutylene and ethylene, with 500 ppm t-butyl peroctoate, was polymerized in an autoclave at 1200 bar, 220° C.

An ethylene/vinyl acetate/isobutylene terpolymer, with 13.5% vinyl acetate and 7.8% isobutylene by weight, 9.3 $CH_3$ units per hundred $CH_2$ by NMR, Mn 5450 was recovered.

Example K 100 g of ethylene-vinyl acetate copolymer, 36% by weight vinyl acetate, Mn 3300, degree of branching $CH_3:100\ CH_2:4$, were put into a flask fitted with a stirrer, thermocouple (connected to heat controller), nitrogen inlet and a condenser arranged for distillation, and heated to 60° C. 66.46 g (molar equivalent) of methyl octanoate and 2.268 sodium methoxide (0.1 molar equivalent, as catalyst) were added, and the mixture was heated to 80° C. After 15 minutes, the reaction mixture was heated to 120° C., and maintained at that temperature, a clear distillate collecting in the condenser flask. Samples of polymer were taken at intervals to follow the progress of transesterification by comparing the height of the IR peak at 1240 cm$^{-1}$ (acetate group) with that at 1170 cm$^{-1}$ (octanoate). After 3½ hours, 79% of acetate groups, had been replaced, and 11 g of distillate recovered. The reaction was continued at 120° C. for a further 5 hours, after which time 92% of acetate groups had transesterified. After a further 4 hours at 120° C. with total distillate at 18.2 g, the product was recovered. Yield 122 g, transesterification 94%. Number average molecular weight 4250.

The following fuels were used in Tests described in the following examples:

-continued

| Fuel No. | 1 | 2 | 3 | 4 |
| --- | --- | --- | --- | --- |
| CD | 9 | 6 | 11 | 9 |
| EVA 29 | 9 | 3 | 8 | 3 |
| CD/EVA 29 | 10 | 10 | 13 | 9 |

| Fuel | 1 | 2 | 3 | 4 | 5 | 6 | 7 | 8 | 9 | 10 | 11 | 12 | 13 |
| --- | --- | --- | --- | --- | --- | --- | --- | --- | --- | --- | --- | --- | --- |
| Cloud Point, °C. | −5 | −6 | −5 | −3 | −6 | −7 | −12 | −3 | −4 | +8 | −2 | −6 | +1 |
| S.G. | 0.838 | 0.847 | 0.842 | 0.842 | 0.845 | 0.834 | 0.850 | 0.846 | 0.830 | 0.866 | 0.884 | 0.84 | |
| CFPP, °C. | −6 | −8 | −6 | −3 | −7 | −8 | −12 | −4 | −7 | +3 | −4 | −10 | 0 |
| IBP, °C. | 153 | 154 | 142 | 180 | 185 | 111 | 150 | 174 | 124 | 241 | 178 | 168 | 176 |
| FBP, °C. | 354 | 361 | 360 | 364 | 364 | 357 | 360 | 369 | 357 | 372 | 368 | 358 | 368 |
| 90-20, °C. | 105 | 80 | 102 | 82 | 78 | 126 | 74 | 110 | 118 | 67 | 80 | 79 | 91 |
| FBP-90, °C. | 24 | 31 | 32 | 26 | 35 | 31 | 36 | 26 | 31 | 19 | 27 | 31 | 28 |
| Wax Content, % at 10° C. below cloud point | 2.4 | 3.4 | 3.1 | 3.1 | 2.9 | 2.3 | 2.3 | 2.0 | 3.1 | 3.0 | 3.5 | 3.2 | 3.3 |

CFPP in the Table above is measured as described in "Journal of the Institute of Petroleum", 52 (1966), 173.

EXAMPLE 1

In this Example, a blend of 86% by weight of the product of Example C and 14% by weight of the product of Example D (referred to below as Blend CD) was used in various fuels, at various treat rates. The reduction in CFPP was compared with that achieved by a blend of the starting polymers (referred to below as EVA Blend) in the same proportions.

| Fuel No. | 1 | 2 | 3 | 4 | 5 | 6 | 7 | 8 | 9 | 10 |
| --- | --- | --- | --- | --- | --- | --- | --- | --- | --- | --- |
| Treat Rate, ppm | 300 | 300 | 100 | 200 | 200 | 100 | 50 | 100 | 100 | 400 |
| Reduction in CFPP with Blend CD, °C. | 9 | 6 | 11 | 9 | 16 | 8 | 10 | 16 | 10 | 14 |
| Reduction in CFPP with EVA Blend, °C. | 7 | 3 | 8 | 4 | 11 | 4 | 12 | 11 | 7 | 14 |

From the results, it can be seen that the ethylene/vinyl hexanoate polymer blend gives better results than the commercial ethylene/vinyl acetate polymer blend in 8 of the 10 fuels tested.

EXAMPLE 2

Blend CD was in turn blended with an ethylene/vinyl acetate copolymer (29% vinyl acetate, Mn 3300, referred to below as EVA 29) in equal proportions, the resulting blend being referred to below as CD/EVA, and the CFPP reduction in various fuels measured. A comparison was made with the reduction achieved using EVA 29 alone and Blend CD alone.

| Fuel No. | 1 | 2 | 3 | 4 |
| --- | --- | --- | --- | --- |
| Total Treat Rate Reduction in CFPP, °C. Blend: | 300 | 300 | 100 | 200 |

The results show that a blend of a composition according to the invention with a commercial cold flow additive gives a further improvement in many fuels.

EXAMPLES 3 AND 4

In these Examples, the effect on the CFPP of Fuel No. 2 of the combination of a nucleator and arrester was measured.

There were used the product of Example D and the corresponding product obtained by reesterifying the same ethylene-vinyl acetate copolymer with butanoyl chloride; these are designated D6, for the polymer of Example D itself, and D4, for the butanoate. There were also used the product of Example C (designated C6) and the corresponding product obtained using butanoyl chloride for re-esterification (C4). In Example 3, a mixture of D6 and C4 in a weight ratio of 1:3 was used and in Example 4 mixture of equal proportions of D4 and C6 was used, in each case at a total treat rate of 100 ppm in Fuel No. 2, which has a CFPP of −4° C. The CFPP was in each case reduced to −18° C.

Reduction achieved with 100 ppm of ethylene-vinyl acetate copolymer (29% vinyl acetate, Mn 3300) is only to −14° C. while with an ethylene-vinyl propionate copolymer (vinyl propionate content 38%, Mn 5200), the CFPP was reduced only to −4° C.

EXAMPLES 5 AND 6

These examples show the effect on CFPP of two compositions according to the invention on Fuel 11.

As nucleator, or lower ester content polymer, there was used an ethylene-vinyl acetate copolymer, vinyl acetate 13.5%, Mn 5000. As arrestor, or higher ester content polymer, there was used in Example 5 the product of Example H. In Example 6, a product prepared by saponification as described in the first part of Example A, re-esterified in the same manner as described in that Example but using butanoyl chloride was used.

In both Examples, the ethylene/vinyl acetate copolymer nucleator was employed at a treat rate of 25 ppm, while the arrestors were each employed at a treat rate of 75 ppm.

| Example | CFPP, °C. |
|---------|-----------|
| 5       | −17       |
| 6       | −21       |

EXAMPLES 7 AND 8

In these Examples, the product of Example J was used in Fuel 11 as nucleator, and the arrestors were, in Example 7, the product of Example H, and in Example 8 the same arrestor as used in Example 6. In both Examples 7 and 8, the nucleator was used at a treat rate of 25 ppm, and the arrestor at 75 ppm.

| Example | CFPP, °C. |
|---------|-----------|
| 7       | −17       |
| 8       | −18       |

We claim:

1. A crude oil, lubricating oil or fuel oil composition comprising an additive effective to improve low temperature flow of the oil, the additive comprising:

(i) an oil-soluble ethylene copolymer having, in addition to units derived from ethylene, from 7.5 to 35 molar per cent of units of the formula $$-CH_2-CRR^1- \qquad \text{I}$$

and (ii) an oil-soluble ethylene copolymer having, in addition to units derived from ethylene, up to 10 molar per cent of units of the formula $$-CH_2-CRR^2- \qquad \text{II}$$

wherein each R independently represents H or CH$_3$, and each R$^1$ and R$^2$ independently represents a group of the formula COOR$^3$ or OOCR$^4$, wherein R$^3$ and R$^4$ independently represent a hydrocarbyl group, provided that R$^1$ and R$^2$ do not both represent the acetate group, the proportion of units I in polymer (i) being at least 2 molar per cent greater than the proportion of units II in polymer (ii), wherein (A) the composition also contains an ethylene-vinyl ester copolymer further to any that may be present; or (B) at least one of polymer (i) and polymer (ii) additionally contains units of the formula $$-CH_2-CRR^5- \qquad \text{III}$$

where R$^5$ represents —OH, or of the formula $$-CCH_3(CH_2R_6)-CHR^7- \qquad \text{IV}$$

where R$^6$ and R$^7$ each independently represent hydrogen or an alkyl group with up to 4 carbon atoms; or (C) at least one of R$^3$ and R$^4$ represents an alkyl or alkenyl group having at least 4 carbon atoms, and at least one of (i) or (ii) is a copolymer made by (a) saponification and re-esterification or (b) transesterification of an ethylene-vinyl acetate or propionate copolymer or an ethylene-methyl or ethyl(meth)acrylate copolymer.

2. A crude oil, lubricating oil or fuel oil composition comprising an additive effective to improve the low temperature flow of the oil, the additive comprising an oil-soluble ethylene copolymer having, in addition to units derived from ethylene, from 7.5 to 35 molar per cent of units of the formula $$-CH_2-CRR^1- \qquad \text{I}$$

and up to 10 molar per cent of units of the formula $$-CH_2-CRR^2- \qquad \text{II}$$

wherein each R independently represent H or CH$_3$, and each R$^1$ and R$^2$ independently represents a group of the formula COOR$^3$ or OOCR$^4$, wherein R$^3$ and R$^4$ independently represent a hydrocarbyl group, provided that R$^1$ and R$^2$ do not both represent the acetate group, the proportion of units I in the polymer being at least 2 molar per cent greater than the proportion of units II in the polymer, and at least one of I or II is a copolymer made by (a) saponification and re-esterification or (b) transesterification of an ethylene-vinyl acetate or propionate copolymer or an ethylene-methyl or ethyl(meth)acrylate copolymer.

3. A composition as claimed in claim 1 or claim 2, wherein R$^3$ and R$^4$ each represents a linear alkyl group having at least four carbon atoms.

4. A composition as claimed in any one of claims 1 or 2, wherein R$^3$ and R$^4$ have at most 30 carbon atoms.

5. A composition as claimed in any one of claims 1 or 2, wherein R$^1$ and R$^2$ each represents —OOCR$^4$.

6. A composition as claimed in any one of claims 1 or 2, wherein R represents H.

7. A composition as claimed in any one of claims 1 or 2, in which R$^1$ and R$^2$ each represent a group of the formula OOCR$^4$ in which R$^4$ represents an alkyl group having from 5 to 13 carbon atoms.

8. A composition as claimed in any one of claims 1, or 2 wherein polymer component (i) has a number average molecular weight (Mn) of at most 14,000.

9. A composition as claimed in claim 8, wherein Mn is in the range of from 2,000 to 5,500.

10. A composition as claimed in any one of claims 1, or 2, wherein polymer component (ii) has a number average molecular weight of at most 20,000.

11. A composition as claimed in claim 10, wherein Mn is in the range of from 3,000 to 10,000.

12. A composition as claimed in any one of claims 1, or 2, wherein units of the formula I represent from 11 to 16 mole per cent of polymer (i) and units of the formula II represent from 3.5 to 7.0 mole per cent of polymer (ii).

13. A composition as claimed in any one of claims 1 or 2 wherein the copolymer is an ethylene-vinyl acetate copolymer.

14. A composition as claimed in claim 13, wherein the ethylene-vinyl acetate copolymer contains from 7.5 to 35 molar per cent acetate units.

15. A composition as claimed in any one or claims 1 or 2, which also comprises a comb polymer.

16. A composition as claimed in claim 15, wherein the comb polymer is of the general formula

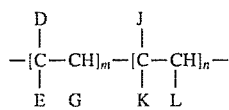

wherein D=R, $COOR^{11}$, OCOR, $R^{12}$, $COOR^{11}$, or $OR^{11}$,

E= H, $CH_3$, D, or $R^{12}$,

G=H or D

J=H, $R^{12}$, $R^{12}COOR^{11}$, or an aryl or heterocyclic group,

K=H, $COOR^{12}$, $OCOR^{12}$, $OR^{12}$, or COOH,

L=H, $R^{12}$, $COOR^{12}$, $OCOR^{12}$, COOH, or aryl, $R^{11} \geq C_{10}$ hydrocarbyl, $R^{12} \geq C_1$ hydrocarbyl, and m and n represent mole ratios, m being within the range of from 1.0 to 0.4, n being in the range of from 0 to 0.6.

17. A composition as claimed in claim 16, wherein the comb polymer is a copolymer of vinyl acetate and a fumarate ester.

18. A composition as claimed to claim 17, wherein the ester groups are alkyl groups having from 12 to 20 carbon atoms.

19. A composition as claimed in claim 18, wherein the ester groups are derived from an alcohol having 14 carbon atoms, or a mixture of alcohols having 14 and 16 carbon atoms.

20. A composition as claimed in claim 16, which comprises a mixture of two or more different comb polymers.

21. A composition as claimed in claim 20, wherein the mixture comprises (I) a $C_{14}$ fumarate ester-vinyl acetate copolymer and (ii) a $C_{14}/C_{16}$ fumarate ester-vinyl acetate copolymer.

22. A composition as claimed in any one of claims 1 or 2, which also comprises a polar nitrogen compound.

23. A fuel or lubricating oil composition comprising an additive composition as claimed in any one of claims 1 or 2.

24. A composition as claimed in claim 23, which contains the additive composition in a total proportion of from 0.005 to 1%, based on the weight of oil.

25. A composition as claimed in claim 24, which contains the additive in a total proportion of from 0.001 to 0.1%, based on the weight of oil.

26. A composition as claimed in claim 25, which contains the additive in a total proportion of from 0.004 to 0.06%, based on the weight of oil.

* * * * *

UNITED STATES PATENT AND TRADEMARK OFFICE
CERTIFICATE OF CORRECTION

PATENT NO.: U.S. 5,554,200          DATED: September 10, 1996

INVENTOR(S): Ramah J. Brod, Brian W. Davies, Tuncel Ibrahim

It is certified that error appears in the above-identified patent and that said Letters Patent is hereby corrected as shown below:

In claim 1, at line 1 of col. 12 in Formula IV, change $R_6$ to $R^7$.

In claim 8, line 1, delete the comma after "claims 1".

In claim 10, line 1, delete the comma after "claims 1" and "2".

In claim 12, line 1, delete the comma after "claims 1".

In claim 16, line 11, delete the comma after "R12".

Signed and Sealed this

Fourteenth Day of January, 1997

*Attest:*

BRUCE LEHMAN

*Attesting Officer*      *Commissioner of Patents and Trademarks*